United States Patent
Mansour et al.

(10) Patent No.: US 10,432,280 B1
(45) Date of Patent: Oct. 1, 2019

(54) ANTENNA ARRAY CORRELATION FOR UPLINK COVERAGE IMPROVEMENT

(71) Applicant: Sprint Communications Company L.P., Overland Park, KS (US)

(72) Inventors: Nagi A. Mansour, Arlington, VA (US); Kevin Almon Hart, Oakton, VA (US); Akin Ozozlu, McLean, VA (US); Krunal Mansukhlal Modasiya, Herndon, VA (US); Noman M. Alam, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/979,081

(22) Filed: May 14, 2018

(51) Int. Cl.
*H04B 7/06* (2006.01)
*H04B 7/08* (2006.01)
*H01Q 1/52* (2006.01)

(52) U.S. Cl.
CPC ........... *H04B 7/0617* (2013.01); *H01Q 1/523* (2013.01); *H04B 7/0857* (2013.01)

(58) Field of Classification Search
CPC .... H04B 7/0408; H04B 7/0617; H04B 7/086; H04B 7/0857; H04L 25/0228; H01Q 1/523
See application file for complete search history.

(56) References Cited

U.S. PATENT DOCUMENTS

| | | | | |
|---|---|---|---|---|
| 6,453,176 B1* | 9/2002 | Lopes | .................... | H01Q 1/246 342/374 |
| 8,666,451 B2* | 3/2014 | Engstrom | ............ | H04B 7/0617 455/562.1 |
| 9,124,333 B1* | 9/2015 | Mansour | .............. | H04B 7/0874 |
| 2003/0198201 A1* | 10/2003 | Ylitalo | .................... | H04B 7/005 370/329 |

* cited by examiner

*Primary Examiner* — David S Huang

(57) ABSTRACT

Systems and methods are provided for improving uplink coverage in a wireless communication network. A first correlated array and a second correlate array each comprise a plurality of antenna elements. Each correlated array has an inter-element spacing of one wavelength of a signal for which the array is configured to receive. The first and second correlated arrays are interleaved such that one-half of a wavelength of a signal for which at least one of the correlated arrays is configured to receive separates adjacent elements of the first and second correlated arrays. Signals received by each correlated array are combined using statistical signal processing techniques to create combined signals that may be provided to the wireless communication network. Combining uplink signals from at least two interleaved uncorrelated arrays may increase the effective spacing of each array without sacrificing base station space or throughput.

20 Claims, 5 Drawing Sheets

ANTENNA ARRAY CORRELATION FOR UPLINK COVERAGE IMPROVEMENT

SUMMARY

The present disclosure is directed, in part, to correlated antenna array configurations to facilitate coverage improvement in wireless communications networks, substantially as shown in and/or described in connection with at least one of the figures, and as set forth more completely in the claims.

In aspects set forth herein, antenna arrays may be configured to increase the distance between correlated antennas while maintaining the overall spacing between antennas of different correlated arrays. Conventional antenna arrays in wireless communications systems commonly employ dipole antennas, connected to a transmitter, receiver, or transceiver. Conventionally, antennas configured to receive signals, whether receive-only or transceive, may take the form of an antenna array comprised of at least two elements. In such cases, the elements of the array are connected to a common receiver or transceiver. In common implementations, the elements of the array are typically arranged in a column of four stacked antennas, each antenna approximately one half wavelength from the adjacent antenna(s). In contrast to the conventional arrangement, antenna array systems and methods for improving coverage utilizing such arrays are disclosed in accordance with aspects herein that may provide significant improvements to network coverage as a result of improvements to the uplink connection.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
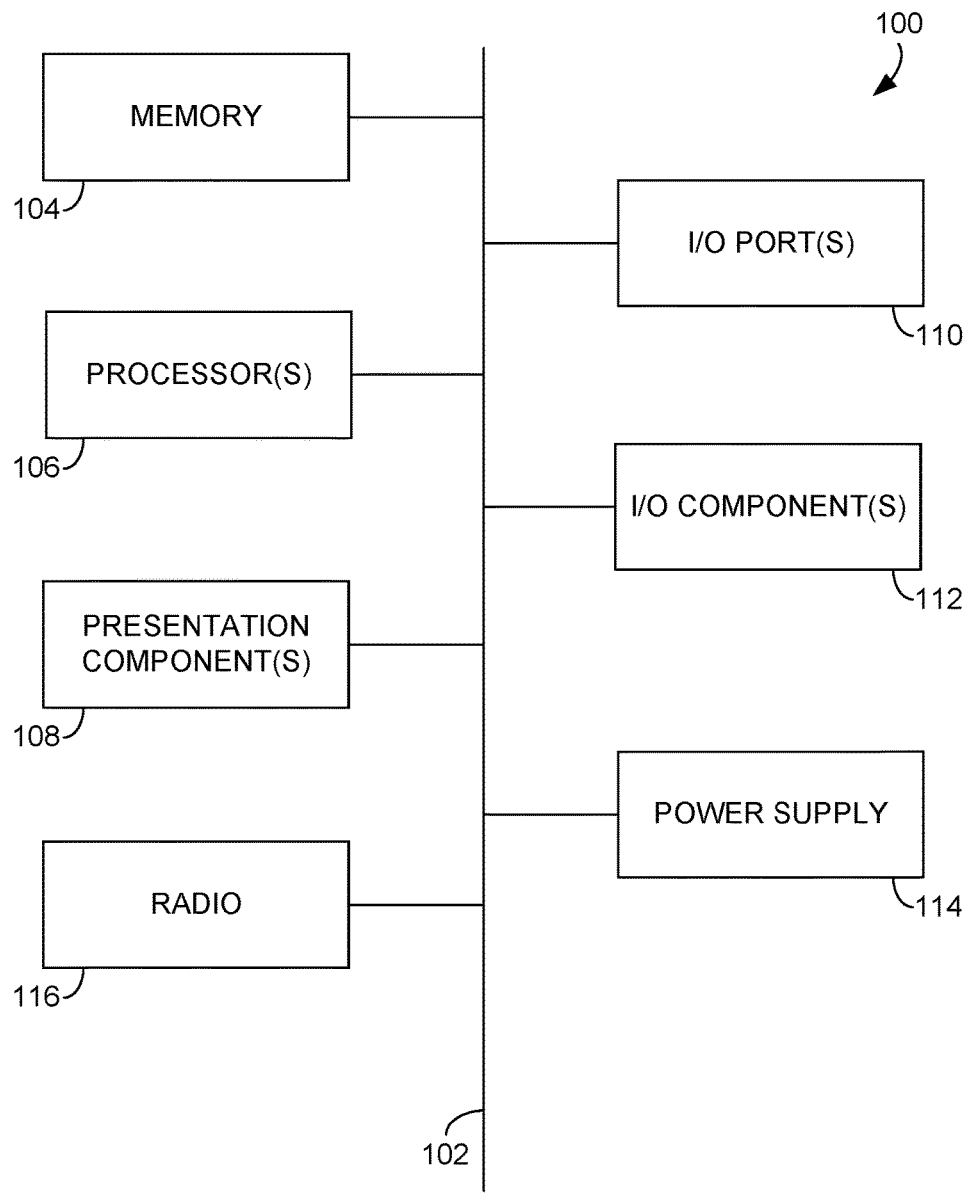
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Wireless System
CD-ROM Compact Disk Read Only Memory
CDMA Code Division Multiple Access
eNodeB Evolved Node B
GIS Geographic/Geographical/Geospatial Information System
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (e.g., cell sites, cell towers) to provide network coverage. Each base station is used to wirelessly transmit and receive information to and from wireless communication devices of the telecommunications network. In the common sector-based cell model, for example, a particular sector may be served by two receive antenna arrays and one transmit antenna array. Such sector-based base stations are limited by the uplink connection with wireless communication devices, as transmit power can be increased to increase the range of downlink connections, whereas UE transmit power is limited by power and federal regulation restrictions. Thus, any non-amplifier based solution to uplink improvement is typically considered on the device-side of the wireless connection. Because the uplink is the limiting factor in an area covered by a particular base station, any increase to the ability of the base station to receive an uplink signal will necessarily improve the coverage of said base station.

Generally, conventional base stations rely on two antenna arrays configured to provide uplink connections with UE. Each of the two receive-configured antenna arrays typically comprise four dipole elements arranged in a single vertical column. In some instances, each of the receive-configured antenna arrays may be connected to a dedicated receiver, more commonly, the two are connected to the same receiver. It is typical to vertically space each element of a particular array a distance of one half wavelength from the immediately adjacent element and to horizontally space each element of a particular array a distance of one quarter wavelength from a reflector plate, located behind the elements (on the opposite side of the antenna from the served-sector).

In existing multi-array base stations, such as those having two receive-configured arrays connected to a common receiver, each uplink array receives a signal. Despite the fact that the information contained in the signal may be identical, signals realized at each individual array may vary based on a variety of network, physical, and environmental factors. In order for the single receiver to make sense of the multiple signals, each signal is first fed in to a selector, which processes the signals to select the best signal (e.g., based on signal strength, SINR, etc.).

In accordance with embodiments described herein, particular configurations of antenna arrays in conjunction with particular signal processing techniques can be used to improve the coverage of a base station based on improvements in the uplink. Though embodiments of the present disclosure are directed to conventional wireless telecommunication networks, other embodiments are equally applicable to any wireless communication system utilizing antenna arrays on at least the uplink side. Further, in some aspects, the systems and methods described herein may be utilized in modern wireless communications networks utilizing nodeB or enodeB, such as 3G, 4G, LTE, or LTE-advanced networks. In other aspects, the systems and methods descried herein may be utilized in next generation wireless communication networks, such as those implementing 5G and utilizing MIMO, FD-MIMO, or 3D MIMO technology.

Using the particular configuration of antenna arrays in the uplink in combination with certain signal processing techniques, certain benefits in the uplink may be realized. In some aspects, the quality of the uplink signal realized at the base station may be improved. This may result in a network decision to keep the UE attached to the currently-serving base station instead of instructing the UE/network to hand off to a more proximate base station. Such quality improvements may be particularly seen at the edges of a particular sector. Because low-quality based hand offs may be reduced, base stations may be spaced further apart. In other aspects, range of the uplink signal may be improved. In such a case, the quality of the signal may remain appreciably unchanged, but the range at which a UE may effectively communicate with the base station may increase. Similar to quality improvements, range improvements may also result in a decrease in the density of base stations to serve the same area. Either way, having fewer base stations significantly reduces the time and expense of providing or updating network architecture, reduces processing demands on the network side, and may result in improved wireless communications realized at the UE.

Figure 2:
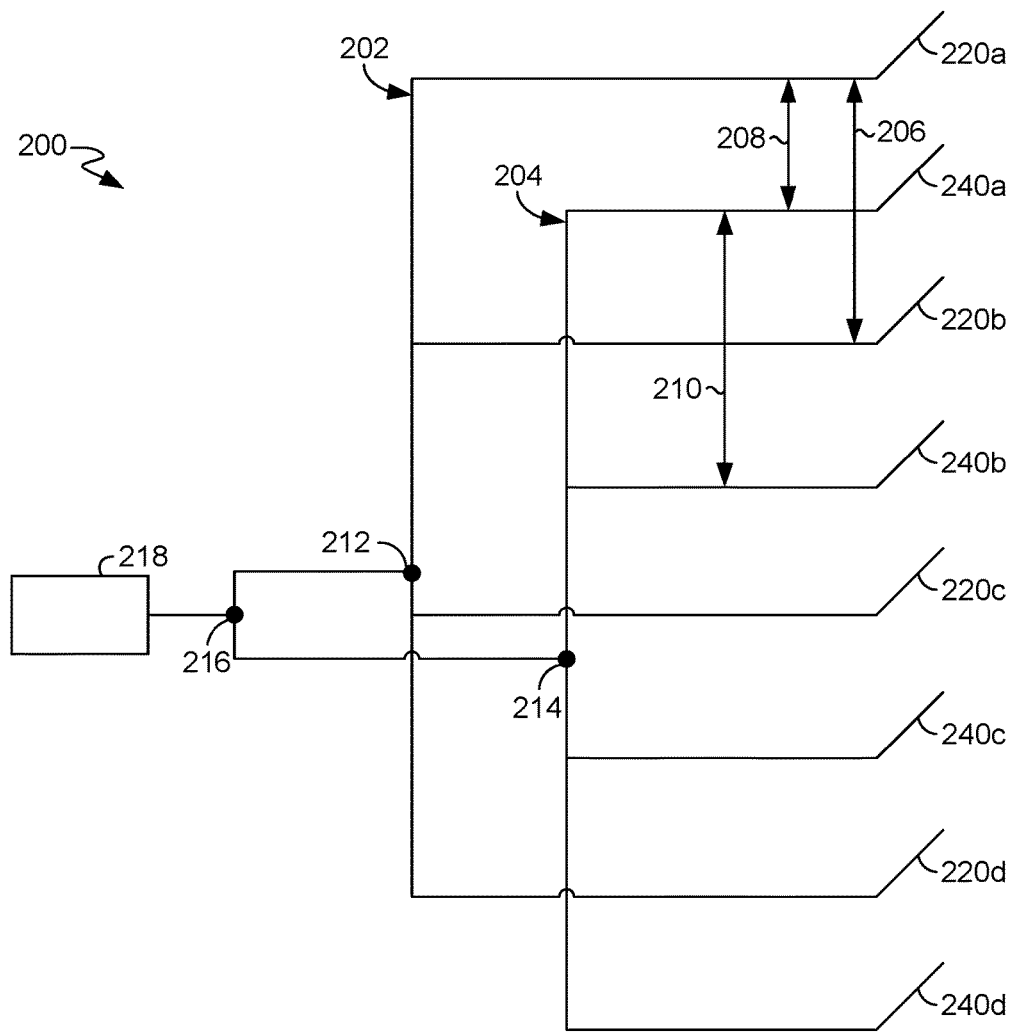
FIG. 2 illustrates an exemplary antenna array configuration comprising dipole antennas for an uplink/receive connection with a wireless communications device in accordance with aspects herein.
Figure 3:
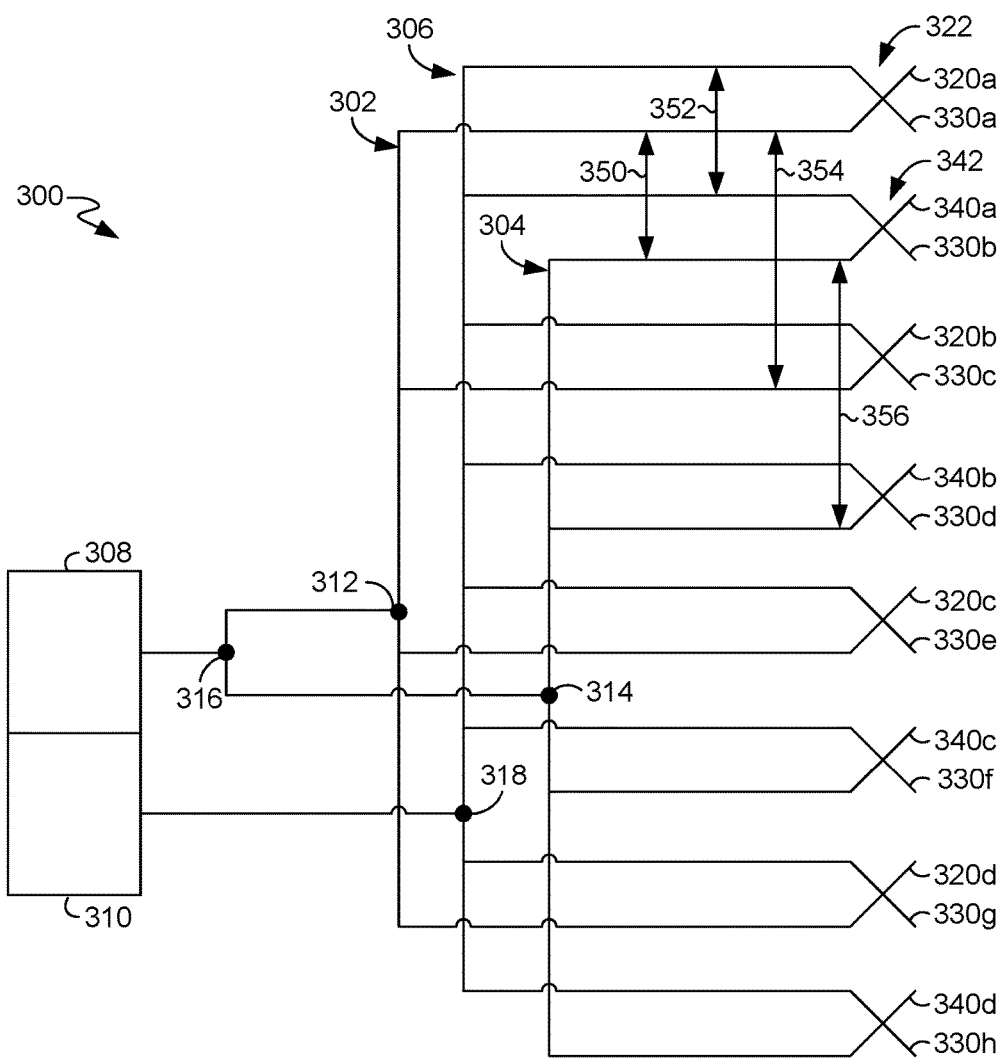
FIG. 3 illustrates an exemplary antenna array configuration comprising crossed dipole antennas for two-way communication with a wireless communications device in accordance with aspects herein.
Figure 4:
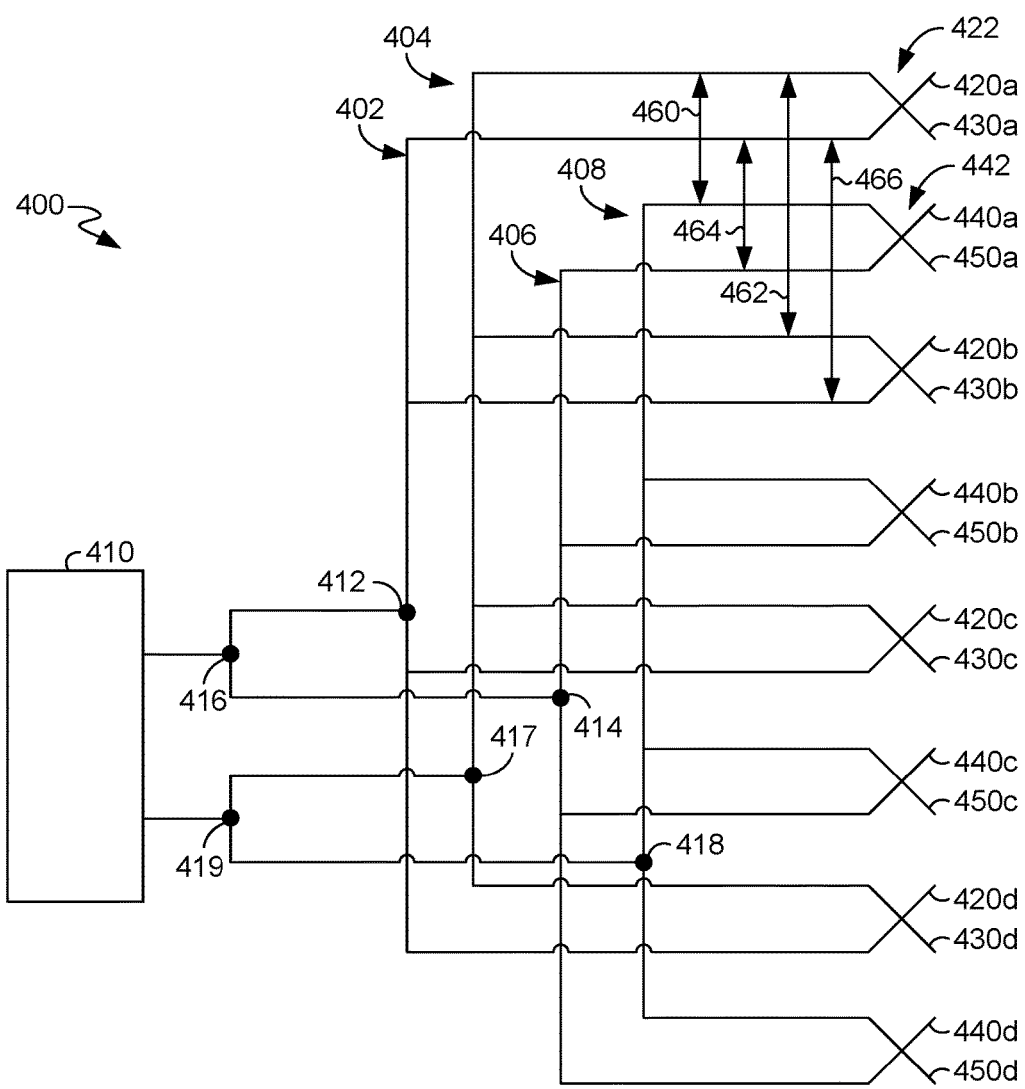
FIG. 4 illustrates an alternative embodiment of an exemplary antenna array configuration comprising crossed dipole antennas for two-way communication with a wireless communications device in accordance with aspects herein.

As used herein, and depicted in FIGS. 2-4, antenna arrays having at least two elements may be linearly arranged. Such an arrangements may occur vertically or horizontally, relative to a ground plane; however, any linear configuration, even if non-vertical or non-horizontal, is expressly consistent with aspects herein. In other aspects, arrangements of individual elements may be in any geometric shape suitable for implementing aspects of the present invention. For example, a circular arrangement of alternating or cycling elements of correlated arrays may be useful in certain applications. In light of this, general descriptions of inter-element spacing or inter-array spacing should not be construed as limited to one particular arrangement in space.

As will be used throughout, the term "correlated" may be used to describe an array or elements of an array. Correlated is used herein to describe a configuration wherein at least two antenna elements, or at least two antenna arrays, are connected to a common point, such as a combination point, a junction, a processor, a bus, or another suitable unitary point. As will be used throughout, the term "uncorrelated" may be used to describe antenna elements or antenna arrays. Two elements or arrays may be described as uncorrelated if they are not directly connected (as may be depicted in wiring diagram or schematic, for example) to the same combination point, junction, processor, bus, or other unitary point. The term uncorrelated should not be interpreted to mean that the elements or arrays aren't connected or combined after passing through an intermediate point.

Accordingly, in a first aspect of the present disclosure, an embodiment is directed to the uplink portion of a wireless communication system for improving uplink coverage in one or more wireless communication networks. The system comprises a first correlated array and a second correlated array, a first and a second combining component, and at least one processor. Each of the first and second correlated arrays comprise at least two antenna elements. Each antenna element of the first correlated array is connected to the first combining component. Each antenna element of the second correlated array is connected to the second combining component. The arrays are arranged in an alternating configuration wherein a distance of one half wavelength separates an element of the first correlated array and the adjacent element of the second correlated array, and a distance of one wavelength separates elements of the same correlated array.

In a second aspect of the present disclosure, an embodiment is directed to a two-way wireless communication system for improving uplink coverage in one or more wireless communication networks using a plurality of correlated crossed dipole antenna arrays. The system comprises a first, second, and at least one downlink array, at least a first and second combining component, and at least one processor. Each crossed dipole is formed by an uplink dipole of either the first or second correlated array and an element of the at least one downlink array. Each element of the first and second correlated arrays is separated by a distance of one wavelength from the next element of the same correlated array, and each element of the first correlated array is separated from the adjacent element of the second correlated array by a distance of one half wavelength.

A third aspect of the present disclosure is directed to a method for improving uplink connections between a UE and a base station. The method comprises receiving a first signal at a first correlated array and receiving either the same first signal or a different second signal at the second correlated array. The signals received by each array are combined using particular signal processing techniques and the resultant combined signal is fed to a processor, where an aggregated signal is created and communicated to the wireless communication network.

As employed herein, user equipment (UE) (also referenced herein as a user device or wireless communication device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station. A UE may be, in an embodiment, similar to device 100 described herein with respect to FIG. 1. The device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

FIG. 2 provides an exemplary system for implementing aspects of the present disclosure. Such a system is illustrated and designated generally as a system 200. The system 200 is but one example of a suitable system and is not intended to suggest any limitation as to the scope of use or functionality of the invention. Neither should any system depicted herein be interpreted as having any dependency or requirement relating to any one or combination of features illustrated.

As seen in FIG. 2, a system in accordance with the present disclosure is illustrated. A wireless communications system 200 is presented for improving uplink coverage in a wireless communication network. The system 200 comprises a first correlated array 202, a second correlated array 204, a plurality of antenna elements 220, 240, a first combining component 212, a second combining component 214, a third combining component 216, and a processor 218. In aspects, the first correlated array 202 and the second correlated array 204 are configured to communicate with UE in the uplink. The uplink connection is used generally herein to describe the communication received from a UE, such as the one discussed in relation to FIG. 1, by a network communication link, such as a base station.

As introduced above, the system 200 comprises a first correlated array 202 and a second correlated array 204. The first correlated array 202 comprises at least two antenna elements. Though FIG. 2 depicts the first correlated array 202 as consisting of four antenna elements 220a-d, as few as two elements, or as many as 16 or more may be used. In aspects, each element 220a-d is a dipole antenna element. Such a dipole element may be one quarter wavelength, one half one wavelength, or any multiple of one half wavelength (e.g., 1, 1.5, or 2 wavelengths). In other aspects, each element 220a-d may be of any type of antenna, including without limitation, a crossed dipole, monopole, loop, parabolic, traveling-wave, aperture, yagi-uda, conical spiral, helical, conical, radomes, horn, and/or apertures, or any combination thereof.

In aspects, the elements 220a-d of the first correlated array 202 are separated by an equal distance. An exemplary first distance 206 separates a first element 220a of the first correlated array 202 and a second element 220b of the first correlated array 202. In aspects the first distance 206 is equal to one wavelength of a signal for which the first correlated array 202 is configured to receive. In other aspects, the distance between elements of the same correlated array may be different. For example, the distance between the first element 220a of the first correlated array 202 and the second element 220b of the first correlated array 202 may be different than the distance between the distance between the second element 220b of the first correlated array 202 and a third element 220c of the first correlated array 202.

The system 200 also comprises a second correlated array 204. The second correlated array 204 comprises at least two antenna elements. Though FIG. 2 depicts the first correlated array 204 as consisting of four antenna elements 240a-d, as few as two elements, or as many as 16 or more may be used. In aspects, each element 240a-d is a dipole antenna element. Such a dipole element may be one quarter wavelength, one half one wavelength, or any multiple of one half wavelength (e.g., 1, 1.5, or 2 wavelengths). In other aspects, each element 220a-d may be of any type of antenna, including without limitation, monopole, loop, parabolic, traveling-wave, aperture, yagi-uda, conical spiral, helical, conical, radomes, horn, and/or apertures, or any combination thereof. The individual elements 240a-d of the first correlated array 204 may additionally be the same or of a different structure, size, or type than the elements 220a-d of the first correlated array 202. Additionally, the elements 220a-d of the first correlated array 202 may be the same or different polarity as the elements of the elements 240a-d of the second correlated array 204.

In aspects, the elements 240a-d of the second correlated array 204 are separated by an equal distance. An exemplary first distance 210 separates a first element 240a of the second correlated array 204 and a second element 240b of the second correlated array 204. In aspects the first distance 210 is equal to one wavelength of a signal for which the first correlated array 204 is configured to receive. In other aspects, the distance between elements of the same correlated array may be different. For example, the distance between the first element 240a of the first correlated array 204 and the second element 240b of the second correlated array 204 may be different than the distance between the distance between the second element 240b of the second correlated array 204 and a third element 240c of the second correlated array 204.

In one embodiment of the system 200, the first correlated array 202 and the second correlated array 204 may be configured to receive one or more signals having approximately the same wavelength. As used herein, "approximately" is considered to be within 10%; for example, an approximate average of 10 and 20 would have a range of 13.5-16.5 (+/−1.5 of 15), and an average frequency of 100 MHz may have range of 90-110 MHz. In other embodiments, the first correlated array 202 and the second correlated array 204 may be configured to receive one or more signals having substantially different wavelengths (10% or more difference between wavelengths). In any embodiment, the first correlated array 202 may be approximately bisected by the second correlated array, that is, an element of the second correlated array 204 may be disposed at every half distance between adjacent elements of the first correlated array 202. Accordingly, a third distance 208 can be said to separate the first element 220a of the first correlated array 202 and the first element 240a of the second correlated array 202. The third distance 208 is approximately half the distance of each of the first distance 206 and the second distance 210. For example, if the first distance 206 and the second distance 210 both approximately equal one wavelength, the third distance 208 may equal approximately one half wavelength.

The system 200, and all other systems herein, may be used in any or more of several architectures. In some aspects, the system 200 may be configured to be used in, for example, conventional 3G and/or 4G telecommunication networks that operate in the UHF portion of the RF spectrum, particularly within the frequency range of 400 MHz-2000 MHz. In other aspects, the system 200 may be configured to be used in next generation telecommunication networks, such as 5G. Non-limiting examples of 5G frequencies may comprise UHF and SHF portions of the RF spectrum in the ranges of 500 MHz-70 GHz. In other aspects, the system 200 may be configured for use in non-telecommunication wireless networks, such as those based on the IEEE 802.11 standards, or any other wireless communication data communication network.

An example of the system configured to receive a particular signal is provided in order to provide clarity without imposing any limitations on the various aspects discussed herein. If the system 200 was configured to receive a signal having a carrier frequency of 2.5 GHz, the associated wavelength would be 11.992 cm. Consistent with aspects discusses above, the wavelength can be approximated as 12 cm. A system in accordance with the system 200 may comprise a first correlated array and a second correlated array for uplink communication, each of the first correlated array and the second correlated array configured to receive the signal on the carrier frequency of 2.5 GHz. Each of the first correlated array and the second correlated array may consist of two elements. Using FIG. 2 to provide illustrative context to such an example, each of the first element 220a and second element 220b of the first correlated array 202 and the first element 240a and second element 240b of the second correlated array 204 may be half wavelength dipole elements. Accordingly, each element may be approximately 6 cm in length. Each of the first distance 206 and the second distance 210 may be 12 cm and the third distance 208 may be 6 cm.

Returning to FIG. 2, in aspects, the system 200 may additionally comprise a first combining component 212 and a second combining component 214. The first combining component 212 creates a first combined signal by combining the signal(s) received by each of the elements of the first correlated array 202. The second combining component 214 creates a second combined signal by combining the signal(s) received by each of the elements of the second correlated array 204. Though the signal(s) received by the first correlated array 202 may be the same or different than the signal(s) received by the second correlated array 204, the first combining component 212 may be approximately identical in configuration or composition as the second combining component 214. In aspects, the first combining component 212 may have a different configuration and/or composition than the second combining component 214.

The system 200 may further comprise a third combining component 216. The third combining component 216 creates a combined receive signal by combining the first combined signal and the second combined signal. The third combining component 216 may be approximately identical in configuration or composition as the first combining component 212 and/or the second combining component 214. In other aspects, the third combining component 216 have a different configuration and/or composition as the first combining component 212 and/or the second combining component 214.

Each of the first combining component 212, the second combining component 214, and the third combining component 216 are configured to perform particular signal processing techniques to the signal(s) received therein. In aspects, one or more of the combining components 212, 214, 216 may combine the signal(s) using Maximum Ratio Combining (MRC). In other aspects, one or more of the combining components 212, 214, 216 may combine the signal(s) using Minimum Mean Square Error (MMSE). In yet other aspects, any suitably similar statistical combination method for combining two or more signals may be used. Any one or more of the first combining component 212, the second combining component 214, and the third combining component 216 may utilize hardware components or one or more processors executing instructions from a non-transitory computer storage media to create the first combined signal, the second combined signal, or the combined receive signal in accordance with aspects herein.

The system 200 may further comprise a processing component 218. The combined receive signal created by the third combining component 216 is provided as an input to the processing component 218. The processing component may comprise any configuration or composition of hardware and software elements for translating the combined receive signal into usable information (e.g., for a telecommunications network). In aspects, the processing component 218 may comprise a receiver or transceiver. In other aspects, the processing component 218 may comprise a radio, controller, eNodeB, air interface, or the like. Though depicted as a single component, the processing component 218 may comprise multiple components, elements, etc.

Turning now to FIG. 3, a system 300 is illustrated in accordance with aspects herein. The system 300 depicts an exemplary two-way wireless communication system. The system 300 comprises multiple arrays that can be configured in various ways to provide coverage improvements to a wireless communication network, particularly by improving the uplink coverage.

In aspects, the system 300 comprises at least four crossed dipoles pairs. The system 300 comprises a first correlated array 302, a second correlated array 304, and a third correlated array 306. In aspects, the first correlated array 302 of system 300 may incorporate the features of the first correlated array 202 of system 200, and the second correlated array 304 of system 300 may incorporate the features of the second correlated array 204 for system 200.

The first correlated array 302 and the second correlated array 304 comprise antenna arrays configured to receive at least one signal, for example an uplink signal, from a wireless communication device. The third correlated array 306 may comprise an antenna array configured to transmit at least one signal, for example a downlink signal, to a wireless communication device. The first correlated array 302 and the second correlated array may comprise an equal number of individual antenna elements. The third correlated array 306 may comprise twice the number of individual antenna elements of the first correlated array 302 or the second correlated array 304.

In aspects the first correlated array 302 comprises four individual antenna elements 320a-d. In other aspects, the first correlated array 302 may comprise as few as two elements 320a,b. In aspects, the second correlated array 304 comprises four individual antenna elements 340a-d. In other aspects, the second correlated array 304 may comprise as few as two elements. In aspects, the third correlated array 306 may comprise eight individual antenna elements 330a-d. In other aspects, the third correlated array 306 may comprise as few as four antenna elements.

A series of alternating crossed dipole pairs are formed by combining elements of the first correlated array 302 or the second correlated array 304 with elements of the third correlated array 306. As used herein, "crossed dipole pair" or "crossed dipole" is used to describe the resultant structure of two dipole elements arranged in at least one common plane. For example, a crossed dipole pair may consist of two individual dipole elements, approximately orthogonally arranged to resemble a plus sign or an "X," with each of the four branches consisting of one half of each of the two dipole elements.

In aspects, each of the two dipole elements comprising the crossed dipole pair may be individually connected to separate correlated arrays but not interconnected. In such an aspect, one dipole element of the crossed dipole pair may be an element of a correlated array configured to only receive a signal and the other dipole element of the crossed dipole pair may be an element of an array configured to only transmit a signal. In other aspects, a crossed dipole pair may comprise an element of a correlated array configured to receive a signal, interconnected with an element of an array configured to transmit a signal. Accordingly, when the two elements of the crossed dipole pair are interconnected, the entire crossed pair is configured to selectively receive or transmit (or alternate in a prescribed manner) a signal.

The series of crossed dipole pairs may alternate between the composition of a first crossed dipole pair 322 and a second crossed dipole pair 342. The first crossed dipole pair 322 may comprise an element of the first correlated array 302 and an element of the third correlated array 306. For example, the first crossed dipole pair 322 may comprise a first element 320a of the first correlated array 302 and a first element 330a of the third correlated array 306. The second crossed dipole pair 342 may comprise an element of the second correlated array 304 and the third correlated array 306. For example, the second crossed dipole pair 342 may comprise a first element 340a of the second correlated array 304 and a second element 330b of the third correlated array 306.

The space separating various portions of the system 300 is also depicted in FIG. 3. A first distance 350 may be said to separate two adjacent elements of different receive-configured arrays. In the case of FIG. 3, the first distance 350 is shown between the first element 330a of the first correlated array 302 and the first element 340a of the second correlated array 304. In aspects, the first distance 350 is equal to approximately one-half of the wavelength of a signal that at least one of the first correlated array 302 and the second correlated array 304 is configured to receive. In other aspects, the second distance 352 may be any multiple of one-half wavelength (e.g., 1, 1.5, 2, etc.).

A second distance 352 separates adjacent elements of the third correlated array 306. For example, the second distance 352 is the distance from the first element 330a of the third correlated array 306 and the second element 330b of the third correlated array. In aspects, the second distance 352 is equal to approximately one-half of the wavelength of a signal that the third correlated array 306 is configured to transmit. In other aspects, the second distance 352 may be any multiple of one-half wavelength (e.g., 1, 1.5, 2, etc.) but will be equal to the first distance 350 such that the elements 330a-h form a crossed dipole pair with elements of the first correlated array 302 or the second correlated array 304.

A third distance 354 separates adjacent elements of the first correlated array 302. Likewise, a fourth distance 356 separates adjacent elements of the second correlated array 304. In aspects, the third distance 354 and the fourth distance 356 both equal one-half wavelength of a signal that at least one of the first correlated array 302 and the second correlated array 304 are configured to receive. In other aspects, the third distance 352 and the fourth distance may be any distance equal to double the first distance 350.

The system 300 may further comprise a plurality of combining components, configured to create combined output signals. The system 300 may comprise a first combining component 312 to create a first combined signal from the inputs of the first correlated array 302 and a second combining component 314 to create a second combined signal from the inputs of the second correlated array 304. Optionally, the system 300 may comprise a third combining component 318 to create a third combined signal to be transmitted by the third correlated array 306. The system may also comprise a fourth combining component 316 to create a combined receive signal from the first combined signal and the second combined signal.

In aspects, the first combining component 312 of system 300 may incorporate the features of the first combining component 212 of system 200, the second combining component 314 of system 300 may incorporate the features of the second combining component 214 of system 200, and the third combining component 316 of system 300 may incorporate the features of the third combining component 216 of system 200.

In aspects, the system 300 may additionally comprise one or more processors 308, 310. In some aspects, the system 300 may comprise a single transceiver, or other processor described in regards to processor 218 of system 200, capable of processing both downlink and uplink signals. In other aspects, the system 300 may comprise at least a first processor 308 and a second processor 310. In such an aspect, the first processor 308 may be a receiver, transceiver, or other processor described in regards to processor 218 of system 200, capable of processing a combined uplink signal. Further, the second processor 310 may be a transmitter, transceiver, or other processor described in regards to processor 218 of system 200, capable of processing or creating at least one downlink signal.

Turning now to FIG. 4, a system 400 is depicted in accordance with aspects of the present disclosure. The system 400 may be a system for two way wireless communication or a system for receiving signals from a wireless communication device in a manner; in both embodiments, the system 400 provides a wireless communication network with improved uplink coverage of wireless communication devices.

In a receive-only configuration, the system 400 may comprise four antenna arrays configured to receive at least one signal from at least one wireless communication device. The system may comprise a first correlated array 402, a second correlated array 404, a third correlated array 406, and a fourth correlated array 408. It is conceived that the system may comprise additional correlated arrays in multiples of four, for example, the system 400 may comprise 8, 12, or 16 correlated arrays.

As depicted in FIG. 4, each of the four correlated arrays 402, 404, 406, and 408 may comprise four elements. For example, the first correlated array 402 may comprise a first element 420*a*, a second element 420*b*, a third element 420*c*, and a fourth element 420*d*. In some aspects, each of the four correlated arrays may comprise the same number of elements (e.g., each of the first correlated array 402 and the second correlated array 404 may comprise four elements). In other aspects, one or more of the four correlated arrays may comprise a different number of elements. In both aspects, each correlated array may have as few as two elements. Each element of each array may be of the type or configuration described with respect to the elements 240*a*-*d*, of system 200.

In aspects, every element of each of the four correlated arrays comprises a dipole element. As seen in FIG. 4, a crossed dipole pair may be formed by the combination of two elements of different correlated arrays. For example, a first crossed dipole pair 422 may comprise a first element 420*a* of the first correlated array 402 and a first element 430*a* of the second correlated array 404. In aspects, the crossed dipole pairs formed by various correlated arrays may alternate between the first crossed dipole pair 422 and a second crossed dipole pair 442, wherein the second crossed dipole pair 422 comprises a first element 440*a* of the third correlated array 406 and a first element 450*a* of the fourth correlated array 408.

Each of the first and the second crossed dipole pairs 422, 442 may be configured as discussed with respect to the crossed dipole pairs 422, 342 of system 300. That is, each crossed dipole pair may be comprise interconnected elements of two different correlated arrays. Interconnection of the two elements would permit the system 400 to alternate between using the entire crossed dipole pair to receive a signal on one or the other correlated arrays. For example, a first crossed dipole pair 422 comprising the first element 420*a* of the first correlated array 402 and the second element 430*a* of the second correlated array 304 may alternate between using the entire crossed dipole pair 422 to receive a signal on the first correlated array 402 and the second correlated array 404.

Alternatively, the crossed dipole pair may comprise elements of two correlated arrays wherein the elements are not interconnected. In such a configuration, the crossed dipole pair may be capable of simultaneously or approximately simultaneously receiving at least one signal on each of the correlated arrays comprising the elements. Take, for example, the second crossed pair 442. In such a configuration, the first element 440*a* of the third correlated array 406 may not be interconnected to the first element 450*a* of the fourth correlated array 408; therefore, the third correlated array 406 may receive a first signal from the second crossed dipole pair 442, and the fourth correlated array 408 may simultaneously receive either the first signal or a second signal from the second crossed dipole pair.

In a two-way communication configuration, the system 400 may comprise two correlated arrays configured to receive at least one signal and two correlated arrays configured to transmit at least one signal. For example, first correlated array 402 and the third correlated array 406 may configured to receive a signal; the second correlated array 404 and the fourth correlated array 408 may be configured to transmit at least one signal. In such an embodiment, each of the crossed dipole pairs may comprise one element of a receive-configured correlated array and one element of a transmit-configured correlated array.

As in other aspects, the crossed dipole pairs may alternate between the composition of a first crossed dipole pair 422 and the second crossed dipole pair 442. In two-way communication aspects, the first crossed dipole pairs 422 may comprise an element of the first correlated array 402 and an element of the second correlated array 404. The second crossed dipole pairs 442 may comprise an element of the third correlated array 406 and an element of the fourth correlated array 408.

In aspects, of the two-way communication configuration, the element of the receive-configured array and the element of the transmit-configured array may be interconnected or not interconnected. In aspects wherein the elements are interconnected, the entire crossed dipole pair may be selectively, alternatively, or programmably used to either receive or transmit a signal at a point in time. In aspects wherein the elements are not interconnected, the element of the receive-configured array may receive a signal approximately simultaneously with the transmission of a signal by the element of the transmit-configured array.

In aspects of both the receive-only and the two-way communication configurations, a first distance 460 may separate an element of the second correlated array 404 and an adjacent element of the fourth correlated array 408 (e.g., a first element 440*a* of the fourth correlated array 408 is adjacent to a first element 420*a* of the second correlated array 404 and a second element 420*b* of the second correlated array 404). A second distance 464 may separate an element of the first correlated array 402 and an adjacent element of the third correlated array 406 (e.g., a first element 440*a* of the third correlated array 406 is adjacent to a first element 420*a* and a second element 420*b* of the first correlated array 402). In aspects, the first distance 460 and the second distance 464 may be equal, and may both approximately equal one-half of the wavelength of any signal that any one or more of the correlated arrays is configured to communicate.

A third distance 462 may separate elements of the second correlated array 404 and elements of the fourth correlated array 408. For example, the third distance 462 may separate a first element 420*a* of the second correlated array 404 and a second element 420*b* of the second correlated array 404. A fourth distance 466 may separate elements of the first correlated array 402 and elements of the third correlated array 406. For example, the third distance 466 may separate a first element 430*a* of the first correlated array 402 and a second element 430*b* of the first correlated array 402. In aspects, each of the third distance 462 and the fourth distance 466 may be the same, and may equal one wavelength of any signal that any one or more of the correlated arrays is configured to communicate. In other aspects, each of the third distance 462 and the fourth distance 466 may be equal to double the first distance 406 and/or the second distance 464.

In aspects of the both configurations, the system 400 may additionally comprise at least a first combining component 412, a second combining component 417, a third combining component 414, a fourth combining component 418, a fifth combining component 416, and a sixth combining component 419. Any one or more of the combining components may have a composition or configuration similar to any or more combining components discussed with respect to combining components 312, 314, 316, or 318 of system 300.

The first combining component 412 creates a first combined signal by combining the one or more signals received on each element of the first correlated array 402. The third combining component 414 creates a third combined signal by combining the one or more signals received on each element of the third correlated array 406. In a receive-only configuration of system 400, the second combining component 417 creates a second combined signal by combining the one or more signals received on each element of the second correlated array 404, and the fourth combining component 418 creates a fourth combined signal by combining the one or more signals received on each element of the fourth correlated array 408. In two-way communication configurations of system 400, the second combining component 417 and the fourth combining component 418 may create a combined transmit signal, or may be absent altogether.

In aspects of the receive-only configuration of system 400, the fifth combining component 416 creates a first pairwise receive signal by combining the first combined signal received from the first combining component 412 with the third combined signal received from the third combining component 414. The sixth combining component 419 creates a second pairwise receive signal by combining the second combined signal received from the second combining component 417 with the fourth combined signal received from the fourth combining component 418. Not depicted in FIG. 4, the system may additionally comprise a seventh combining component, having a similar composition or configuration of at least portions of the fifth combining component 416 and/or the sixth combining component 419. The seventh combining component may create a total receive signal by combining the first pairwise receive signal from the fifth combining component 416 and the second pairwise receive signal from the sixth combining component 419.

The system 400 may additionally comprise at least one processor 410. In a receive-only configuration, the at least one processor 410 may comprise the features of processor 218 of system 200, such that the processor is configured to receive either the first and second pairwise receive signals or the total receive signal from the combining component that created the respective signal. In aspects, the system 400 may comprise a first processor for receiving the first pairwise receive signal and a second processor for receiving the second pairwise receive signal.

In a two-way communication configuration, the system 400 may comprise at least one processor 410. In aspects, a first processor may receive the first combined signal from the fifth combining component and an optional second processor may output a signal to the second and/or fourth correlated arrays. In other aspects of the system 400, a second processor configured to transmit a first downlink signal may be connected directly to the second correlated array and a third processor configured to transmit either the first downlink signal or a second downlink signal may be connected directly to the fourth correlated array.

Figure 5:
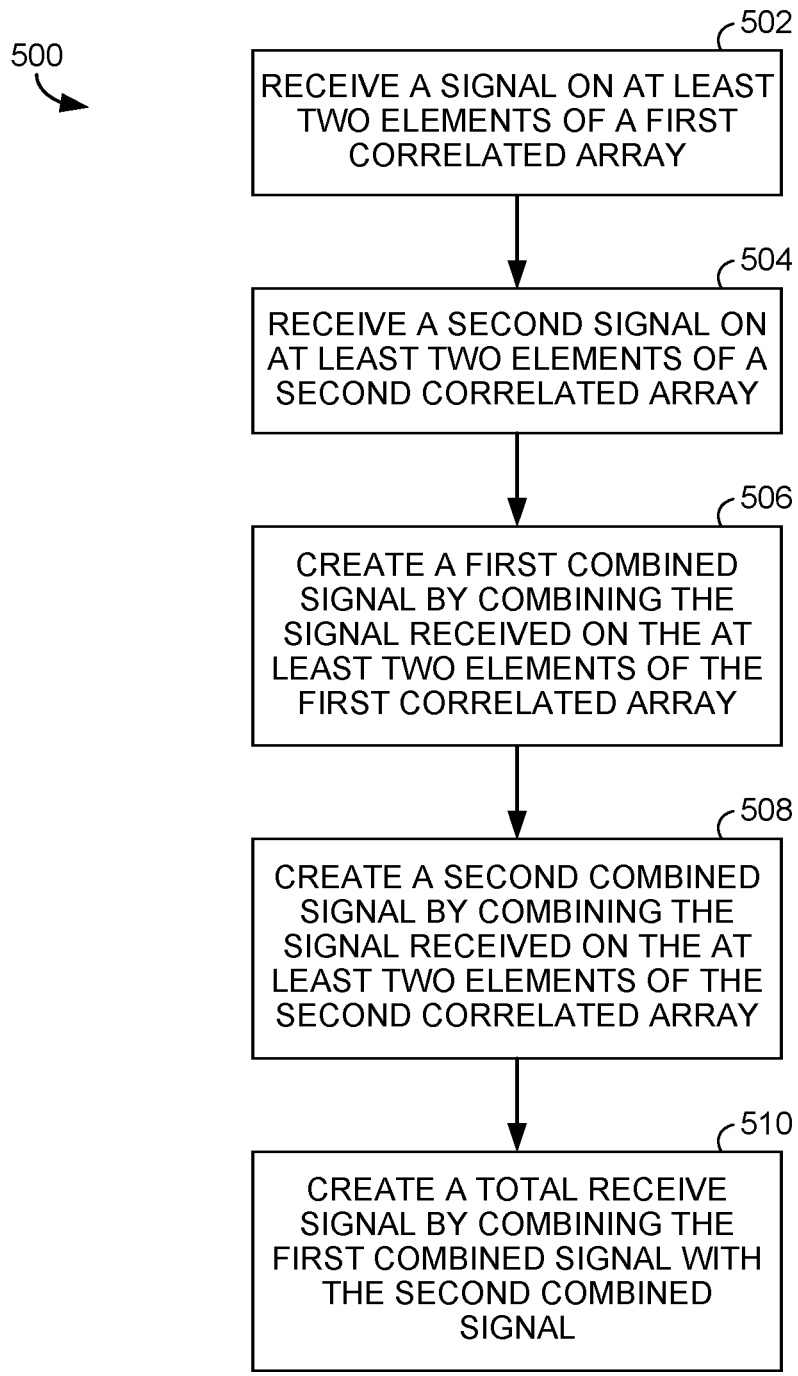
FIG. 5 depicts a flow diagram of an exemplary method for improving uplink connections with a wireless communications device in accordance with implementations of the present disclosure.

Turning now to FIG. 5, a flow diagram is illustrated of an exemplary method 500 for improving uplink coverage in a wireless communication network, in accordance with implementations of the present disclosure.

Initially at block 502, a first uplink signal is received on at least two elements of a first correlated array. The configuration and composition of the first correlated array may comprise features discussed in reference to any one or more of the first correlated arrays of system 200, system 300, and/or system 400.

At block 504, a second uplink signal is received on at least two elements of a second correlated array. The configuration and composition of the second correlated array may comprise features discussed in reference to any one or more of the second correlated arrays of system 200 and system 300 and/or the third correlated array of system 400. In aspects, the first uplink signal and the second uplink signal may be the same signal; in other aspects, the first uplink signal and the second uplink signal may be different signals.

At block 506, a first combined signal is created by combining the signal received on the at least two elements of the first correlated array. In aspects, the first combined signal is created using a combining component having features of any one or more of the combining components 212 of system 200, combining component 312 of system 300 and/or combining component 412 of system 400. As discussed with reference to the combining components of those systems, the combining of block 506 may utilize MMSE or MRC to combine the first uplink signals received from each element of the first correlated array in to the first combined signal.

At block 508, a second combined signal is created by combining the signal received on the at least two elements of the second correlated array. In aspects, the second combined signal is created using a combining component having features of any one or more of the combining components 214 of system 200, combining component 314 of system 300, and/or combining component 414 of system 400. As in block 506, the combining of block 508 may utilize MMSE or MRC to combine the second uplink signals received from each element of the second correlated array. In aspects, the combining of block 508 may be done in the same manner, but to different inputs, as the combining of block 506 (e.g., MMSE may be utilized in both blocks). In other aspects, the combining of block 508 may be done at least partially differently than the combining of block 506 (e.g., MMSE may be used in block 508 and MRC used in block 506).

At block 510, a total receive signal is created by combining the first combined signal, created in block 506, with the second combined signal, created in block 508. In aspects, the total receive signal is created using a combining component having features of any one or more of the combining components 216 of system 200, combining component 316 of system 300, and/or combining component 416 of system 400. In aspects, the combining of block 510 may comprise using MMSE and/or MRC to create the total receive signal from the input first and second combined signals.

Though method 500 is illustrated in a particular order, in some aspects, the blocks may be completed in a variety of different orders. Block 502 need occur prior to block 506, block 504 need occur prior to block 508, and blocks 506 and 508 need occur prior to block 510.

The method 500 may additionally comprise providing the total receive signal to one or more processors (not shown). Processor(s) suitable for use in method 500 may have features similar to the processor(s) of system 200, system 300, and/or system 400. In aspects, the processor need only act as an interface between the wireless communication network and the signal receiving and processing array.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for improving uplink coverage in a wireless communication network, the system comprising:
   a first correlated antenna array configured to receive a first signal having a first wavelength, the first correlated antenna array comprising a first plurality of antenna elements separated by a distance of one of the first wavelength;
   a first combining component that creates a first combined signal by combining the signal received by each of the first plurality of antenna elements;
   a second correlated antenna array configured to receive a second signal having a second wavelength, the second correlated antenna array comprising a second plurality of antenna elements separated by a distance of one of the second wavelength, wherein each of the second plurality of antennas is disposed at a distance of approximately half of an average of the first wavelength and the second wavelength from the nearest element of the first correlated antenna array; and
   a second combining component that creates a second combined signal by combining the signal received by each of the second plurality of antenna elements.

2. The system of claim 1, wherein at least one of the first combining component and the second combining component utilizes maximum ratio combining (MRC) to create at least one of the first combined signal and the second combined signal.

3. The system of claim 1, wherein at least one of the first combining component and the second combining component utilizes minimum mean squared error (MMSE) to create at least one of the first combined signal and the second combined signal.

4. The system of claim 1, wherein the first wavelength and the second wavelength are approximately the same.

5. The system of claim 4, wherein the first signal and the second signal are the same signal.

6. The system of claim 1, further comprising a third combining component, wherein the third combining component creates a total receive signal by combining the first combined signal and the second combined signal using signal processing techniques comprising at least one method selected from a group consisting of MRC and MMSE.

7. The system of claim 6, further comprising a processor, wherein the processor receives the total receive signal and provides the wireless communication network with the total receive signal.

8. A method for improving uplink connections between a wireless communication devices and a base station, the method comprising:
   receiving a first signal on each of a first plurality of antennas comprising a first correlated array;
   creating a first combined signal by combining the first signal received by each of the first plurality of antennas;
   receiving a second signal on each of a second plurality of antennas comprising a second correlated array, the first correlated array being uncorrelated with the second correlated array;
   creating a second combined signal by combining the second signal received by each of the second plurality of antennas; and
   creating a total receive signal by combining the first combined signal with the second combined signal.

9. The method of claim 8, further comprising communicating the combined uplink signal to at least one processor.

10. The method of claim 8, wherein at least one of the first combined signal and the second combine signal is created by using MMSE to combine the signals received by at least one of the first plurality of antennas and the second plurality of antennas.

11. The method of claim 8, wherein each of the first plurality of antennas and the second plurality of antennas comprises four antennas.

12. A system for improving uplink coverage in a wireless communication network, the system comprising:
   a first plurality of correlated antennas, each of the first plurality of correlated antennas configured to receive a signal, the signal having a central frequency and a bandwidth, each of the first plurality of antennas separated by a distance of one wavelength of the central frequency, wherein each of the first plurality of correlated antennas is connected to a first combining component;
   the first combining component, wherein combining component combines the signal received by each of the first plurality of correlated antennas into a first combined signal;
   a second plurality of correlated antennas, each of the second plurality of correlated antennas configured to receive the signal, each of the second plurality of antennas separated by the distance of one wavelength of the central frequency, wherein each of the second plurality of correlated antennas is connected to a second combining component;
   the second combining component, wherein the second combining component combines the signal received by each of the second plurality of correlated antennas into a second combined signal; and
   a third combining component, wherein the third combining component combines the first combined signal and the second combined signal into a combined receive signal;
   wherein the first plurality of correlated antennas and the second plurality of antennas comprise an antenna array, and wherein the distance between an antenna of the first plurality of correlated antennas and an antenna of the second plurality of correlated antennas is one-half of the wavelength.

13. The system of claim 12, wherein at least one of the first combining component, the second combining component, and the third combining component utilizes maximum ratio combining (MRC) to combine signals.

14. The system of claim 12, wherein at least one of the first combining component, the second combining component, and the third combining component utilizes minimum mean squared error (MMSE) to combine signals.

15. The system of claim 12, wherein each antenna of the first plurality of correlated antennas and the second plurality of correlated antennas comprises a cross polarized dipole antenna.

16. The system of claim 12, wherein each antenna of the first plurality of correlated antennas comprises a first dipole of a first plurality of cross polarized dipole antennas and each antenna of the second plurality of correlated antennas comprises a first dipole of a second plurality of cross polarized dipole antennas.

17. The system of claim 16, further comprising:
a third plurality of correlated antennas, each of the third plurality of correlated antennas comprising a second dipole of the first plurality of cross polarized dipole antennas, each of the third plurality of antennas configured to receive the signal and separated by the distance of one wavelength of the central frequency, wherein each of the third plurality of correlated antennas is connected to a fourth combining component;
the fourth combining component, wherein the fourth combining component combines the signal received by each of the third plurality of correlated antennas into a third combined signal;
a fourth plurality of correlated antennas, each of the fourth plurality of correlated antennas comprising a second dipole of the second plurality of cross polarized dipole antennas, each of the fourth plurality of antennas configured to receive the signal and separated by the distance of one wavelength of the central frequency, wherein each of the fourth plurality of correlated antennas is connected to a fifth combining component; and
a fifth combining component, wherein the fifth combining component combines the signal received by each of the fourth plurality of correlated antennas into a fourth combined signal; and
a sixth combining component, wherein the fifth combining component combines the third combined signal and the fourth combined signal.

18. The system of claim 17, wherein each of the first plurality of antennas, the second plurality of antennas, the third plurality of antennas, and the fourth plurality of antennas comprise four antennas.

19. The system of claim 12, wherein each of the first plurality of antennas and the second plurality of antennas comprise at least two antennas.

20. The system of claim 12, further comprising at least one processor, wherein the combined receive signal is input to the at least one processor.

* * * * *